United States Patent Office.

DANIEL KINDIG, OF NEWVILLE, PENNSYLVANIA.

Letters Patent No. 74,833, dated February 25, 1868.

IMPROVED COMPOSITION FOR CLEANING MILLSTONES.

The Schedule referred to in these Letters Patent and making part of the same.

TO ALL WHOM IT MAY CONCERN:

Be it known that I, DANIEL KINDIG, of Newville, Cumberland county, in the State of Pennsylvania, have invented a New Solution, which, if applied to the burr-stone, keeps the same perfectly clean, and makes a more perfect and much finer article of flour, and a better yield; also enabling the miller, during all seasons, to use the No. 13 bolt, producing thereby a greater quantity of flour. Whilst grinding garlic wheat, it does not become necessary to take up the burrs oftener than once in a fortnight. The solution is to be rubbed on the burrs with a scrubbing-brush.

The solution is composed of the following ingredients: One gallon hot water; two ounces of borax; three balls, of the size of a hazel-nut each, of sal-prunel; and one quarter pound of washing-soda. Mix all that together, and then apply it to the burr.

When grinding garlic wheat, it is not necessary to take up the burrs at all. It is sufficient to drop through the eye of the burr twice a day one of the above-described balls of sal-prunel, and that will keep the burrs sharp and clean.

What I claim as my invention, and desire to secure by Letters Patent, is—

The aforegoing solution, prepared substantially as described for the purpose set forth.

DANIEL KINDIG.

Witnesses:
　　DUGLAS HAYMENL,
　　CHARLES HENERY.